(12) United States Patent
Maniatopoulos et al.

(10) Patent No.: US 12,474,703 B2
(45) Date of Patent: Nov. 18, 2025

(54) UNIFIED INTERFACE BETWEEN A CONTROL SYSTEM AND PLANNERS OF AN AUTONOMOUS VEHICLE

(71) Applicant: GM Cruise Holdings LLC, San Francisco, CA (US)

(72) Inventors: Spyros Maniatopoulos, San Francisco, CA (US); Shad Laws, Redwood City, CA (US); Nitin Kapania, San Francisco, CA (US); Rushil Goradia, San Francisco, CA (US); Andrew Robinson, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 211 days.

(21) Appl. No.: 18/149,569

(22) Filed: Jan. 3, 2023

(65) Prior Publication Data
US 2024/0219906 A1    Jul. 4, 2024

(51) Int. Cl.
*G05D 1/00*    (2024.01)

(52) U.S. Cl.
CPC ......... *G05D 1/0077* (2013.01); *G05D 1/0212* (2013.01)

(58) Field of Classification Search
None
See application file for complete search history.

(56) References Cited

U.S. PATENT DOCUMENTS

| | | | |
|---|---|---|---|
| 2018/0164827 A1* | 6/2018 | Chu | B60W 60/0016 |
| 2019/0113927 A1* | 4/2019 | England | G06F 16/285 |
| 2022/0121201 A1* | 4/2022 | Williams | B60W 60/0011 |
| 2022/0185299 A1* | 6/2022 | Ye | B60W 60/0015 |
| 2024/0059323 A1* | 2/2024 | Gerrese | H04W 4/023 |

* cited by examiner

*Primary Examiner* — Justin S Lee
*Assistant Examiner* — Elizabeth Galyn Martinez
(74) *Attorney, Agent, or Firm* — CANTOR COLBURN LLP

(57) ABSTRACT

Autonomous vehicles may have different specialized primary planners in the vehicle planning stack that each can generate a plan for the vehicle control stack. For instance, one primary planner may be used for the vehicle to drive forward, and another primary planner may be used for the vehicle to drive in reverse. Additionally, a fallback planner may be implemented to allow the autonomous vehicle to drive in a degraded state. A unified interface is provided between the planning stack and the control stack to manage communications between the different planners in the planning stack and the control stack.

14 Claims, 7 Drawing Sheets

UNIFIED INTERFACE BETWEEN A CONTROL SYSTEM AND PLANNERS OF AN AUTONOMOUS VEHICLE

BACKGROUND

Technical Field

The present disclosure generally relates to autonomous vehicles and, more specifically, to a unified interface between a control system and planners of an autonomous vehicle (AV).

Introduction

Autonomous vehicles, also known as self-driving cars, and driverless vehicles, may be vehicles that use multiple sensors to sense the environment and move without human input. Automation technology in autonomous vehicles may enable vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
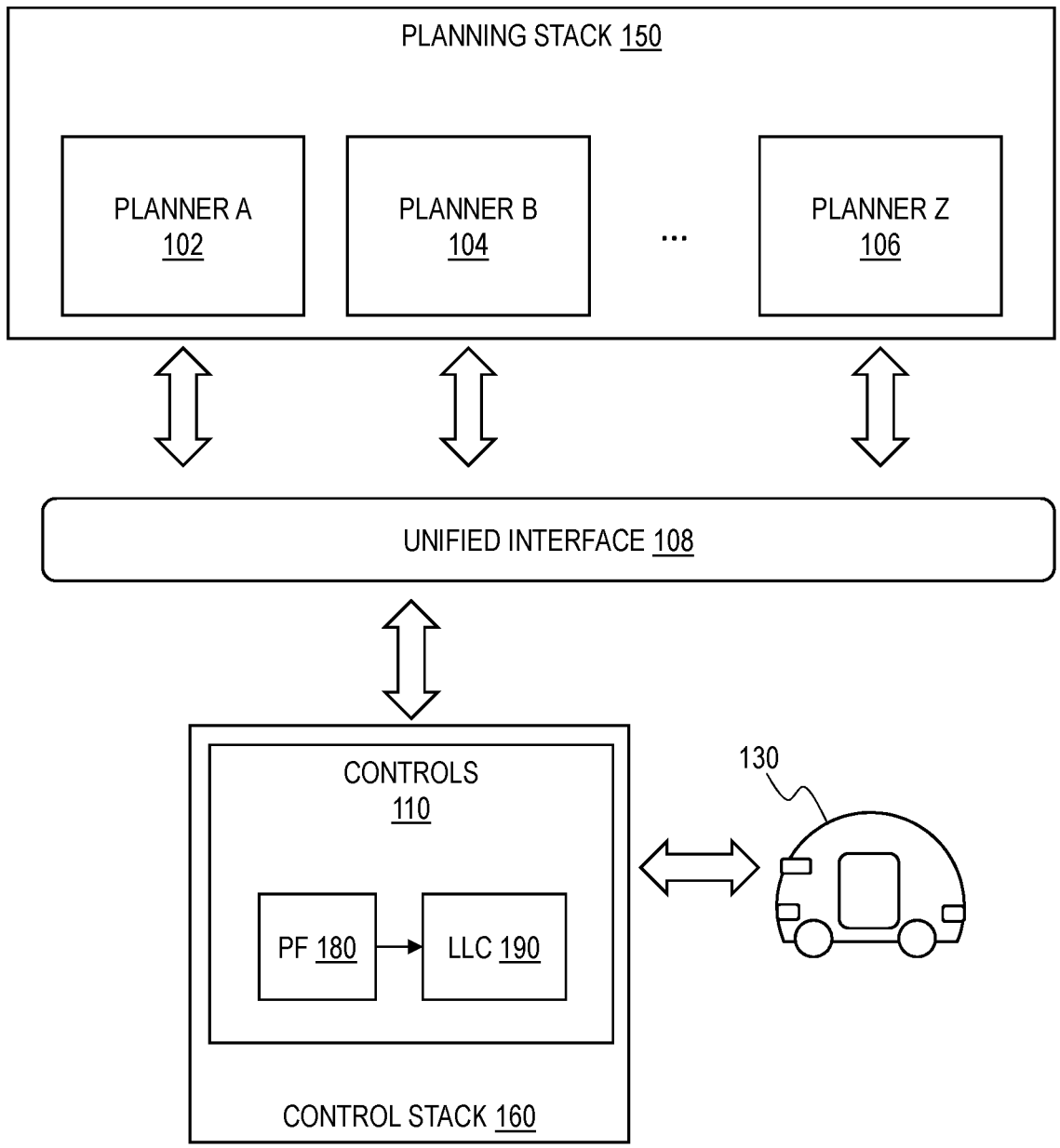
FIG. 1 illustrates planners, controls, and an exemplary unified interface between the planners and the controls, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering an opportunity for efficient, accessible, and affordable transportation. An AV may be equipped with various sensors to sense the environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. The AV may create planned paths based on map information, localization, data from perception, and data from prediction. Subsequently, planned path(s) can be sent to (vehicle) controls to control the AV (e.g., for steering, accelerating, decelerating, braking, etc.) according to the planned path. Vehicle controls may be referred to herein as controls or controller.

The operations of perception, prediction, planning, and control at an AV may be implemented using a combination of hardware and software components. For instance, an AV stack or AV compute process performing the perception, prediction, planning, and control may be implemented as software code or firmware code. The AV stack or AV compute process (the software and/or firmware code) may be executed on one or more processor(s) (e.g., general processors, central processors (CPUs), graphical processors (GPUs), digital signal processors (DSPs), ASIC, etc.) and/or any other hardware processing components on the AV. Additionally, the AV stack or AV compute process may communicate with various hardware components (e.g., onboard sensors and control system of the AV) and/or with an AV infrastructure over a network. In some cases, the AV stack may include a layered arrangement of stacks, including stacks such as a perception stack, a prediction stack, a planning stack, and a control stack. The planning stack may generate one or more plans and transmit the one or more plans to the control stack.

A plan can include several parts or components, such as one or more trajectories, a target gear request, a blinker light request, a hazard light request, a braking request, and a honking request. A plan can include requests or instructions (e.g., software instructions) for vehicle controls in addition to one or more (reference) trajectories. A trajectory can include a contiguous line that connects a starting point/pose of the vehicle and an end point/pose of the vehicle. The line may be defined within a two-dimensional representation of the driving surface or in a three-dimensional representation of the environment surrounding the vehicle. The line may have a corresponding length. Different portions or segments of the line may have different curvatures. The line may have an associated directionality. A trajectory may be multidimensional. Besides including a line, a trajectory may include higher order derivatives such as velocity, acceleration, curvature, curvature rate, etc.

Implementing the planning stack for the AV can be difficult, because the planning stack may be designed to operate under a wide range of diverse scenarios in the real-world. Also, the planning stack may be designed to perform different kinds of tasks in reaction to the diverse scenarios. One paradigm for implementing a complex planning stack is to provide a number of planners that are specialized in generating paths for completing different tasks. Generally, a single planner would be in control of the AV. Depending on the task to be performed and/or whether the AV is in a degraded state, the control of the AV may be exercised by a planner dedicated to performing the task or to operate when the AV is in a degraded state. Sometimes, control of the AV can be transitioned or transferred between different planners. By design, the different planners are not necessarily aware of the other planners.

There are several challenges for the above paradigm. First, the vehicle controls may not be capable of managing and executing different data streams having plans generated by heterogeneous planners. Second, the vehicle controls may not be able to seamlessly and properly transition between different planners. During transitions, the vehicle controls may not be able to ensure that the plans from different planners would not cause the AV to not operate properly. Third, it can be challenging for (software) vehicle controls to properly and/or seamlessly change the direction of motion of the AV (e.g., transitioning between going forward and reverse).

In some embodiments, autonomous vehicles may have different specialized primary planners in the vehicle planning stack that each can generate a plan for the vehicle control stack. For instance, one primary planner may be used for the vehicle to drive forward, and another primary planner may be used for the vehicle to drive in reverse. Additionally, a fallback planner may be implemented to allow the autonomous vehicle to drive in a degraded state. A unified interface is provided between the planning stack and the control stack to manage communications between the different planners in the planning stack and the control stack.

One advantage of the unified interface is to offer a single interface that can manage many different planners. The unified interface can ensure that only a single data stream is being provided to the control stack. The control stack can follow a plan regardless of which upstream planner generated the plan. Furthermore, the unified interface can manage potential inconsistencies in the paths generated by the heterogeneous planners. Moreover, the unified interface can ensure that switching or transitions between different planners can be done properly. Another advantage is that the control stack can offer feedback information via the unified interface to the upstream planners in a coordinated manner. Such feedback information may prevent potential operational inconsistencies in the control stack, or may prevent conditions that can lead to incorrect operation of the control stack or violation of certain contracts in the control stack.

Various embodiments herein and their advantages may apply to a wide range of vehicles (e.g., semi-autonomous vehicles, vehicles with driver-assist functionalities, etc.), and not just autonomous vehicles.

Exemplary Unified Interface Between Planners and Controls

FIG. 1 illustrates planners, controls, and an exemplary unified interface between the planners and the controls, according to some aspects of the disclosed technology. As shown, the unified interface 108 may be provided between planning stack 150 and control stack 160. As discussed previously, the planning stack 150 may include multiple (two or more) planners, which are illustrated as planner A 102, planner B 104, and planner Z 106. While three planners are shown, it is envisioned by the disclosure that some planning stacks may include two planners, and some planning stacks may include more than three planners. The planners may be designed to generate paths for different scenarios or tasks. The planners may be designed with different driving goals.

For instance, one planner may be specialized in generating paths for the AV in structured, nominal driving (e.g., tasks or scenarios that involve the AV driving forward). Structured, nominal driving may involve path planning based on a detailed, lane-level map and detected objects of the AV's surroundings. Another planner may be specialized in generating paths for the AV in unstructured, freespace driving. Unstructured, freespace driving may involve collision-free and safe path planning based on sensor data and potentially without a detailed, lane-level map of the AV's surroundings. Yet another planner may be specialized in generating paths for the AV to drive in reverse. Yet a further planner may be specialized in producing instructions for tasks or scenarios that involve the AV staying still. Other planners may be specialized in generating paths for completing other tasks such as: parking, maneuvering around inside a building structure, pulling over, driving on a highway, driving on a freeway, driving off-road, driving in inclement weather conditions, etc.

The control stack 160 may include controls 110 (e.g., software vehicle controls), which can receive plans generated by the planning stack 150 upstream of the controls 110 and can generate (actuator) commands to control vehicle hardware controls of AV 130 based on the received plans. Examples of vehicle hardware controls of AV 130 may include: vehicle gear control, vehicle blinker light control, vehicle hazard light control, vehicle steering control, vehicle brake control (which can include electronic parking brake control and/or wheel brake control), vehicle motor controls, and vehicle horn control. Controls 110 can send (actuator) commands to vehicle hardware controls to cause a gear of AV 130 to change, cause the AV 130 to brake, cause the AV 130 to turn steering by a certain amount, cause the AV 130 to accelerate by a certain amount, cause the horn of the AV 130 to honk, etc.

In some embodiments, controls 110 of the control stack 160 may include a path follower (PF) 180 and low-level controls (LLC) 190. Path follower 180 may generate a local path for the vehicle to take. The local path may be optimized based on tracking error of the local path relative to a reference trajectory in the output plan received from the unified interface 108. The local path may include a corrective action to get the AV 130 to converge on and stick to the reference trajectory of the received plan when the AV deviates from the reference trajectory. Path follower 180 may produce a local path that follows the reference trajectory of the received plan as closely as possible, given certain constraint(s). Constraints can include: comfort, speed, feasibility, lateral acceleration, curvature, curvature rate, lateral jerk, etc. Low-level controls 190 may generate commands, such as actuator commands, to the vehicle hardware controls based on the local path produced by path follower 180. For instance, low-level controls 190 may translate the local path into, e.g., engine torque, braking torque, steering wheel angle, transmission request, and electronic parking brake request for the vehicle hardware controls. Low-level controls 190 may determine desired gear, and produce gear control commands to change the gear of the vehicle. Low-level controls 190 may determine whether left/right blinker lights or hazard lights are to be turned on, and produce commands to turn on the left/right blinker lights or hazard lights.

A unified interface 108 may be provided between the planning stack 150 and the control stack 160. Providing a unified interface 108 can make the system design more modular. Also, interactions between the planning stack 150 and the control stack 160 may be managed better by one entity, i.e., the unified interface 108. All planners in the planning stack 150 would use the unified interface 108 to interface with the control stack 160. For instance, planners of planning stack 150 may use the unified interface 108 to specify (reference) plans, and may submit other vehicle hardware control requests such as gear shifting or blinkers/hazards light changes. The unified interface 108 being the entity between the planning stack 150 and the control stack 160 can better ensure consistency in time and across planners, optionally arbitrate conflicts or inconsistencies in time and across planners, and have more well-managed coordination across planners. Moreover, the unified interface 108 can manage any number of planners (e.g., planner A 102, planner B 104, and planner Z 106) in the planning stack 150 upstream of the unified interface 108, making the system architecture more amenable to planners being added or removed. Additionally, with the unified interface 108 managing the plans being produced by the planning stack 150, the control stack 160 (e.g., controls 110) may receive and consume a single data stream, regardless of which planner is in control or is active. Generally, the control stack 160 (e.g., controls 110) may be agnostic to which planner is in control or is active.

Communications between a given planner in the planning stack 150 and the unified interface 108 can be unidirectional. A planner can generate plans, and provide the plans from the planning stack 150 to the unified interface 108.

In some cases, communications between a given planner in the planning stack 150 and the unified interface 108 and communications between the control stack 160 (e.g., controls 110) and the unified interface 108 may be bidirectional. In other words, the unified interface 108 may allow bidirectional information traffic between the planning stack 150 and the control stack 160. The control stack 160 (e.g., controls 110) may receive plans from one of the planners through the unified interface 108. The control stack 160 (e.g., controls 110) may provide feedback information through the unified interface 108 to planner(s) in the planning stack.

Exemplary Unified Interface Operating with a Primary Manager

Figure 2:
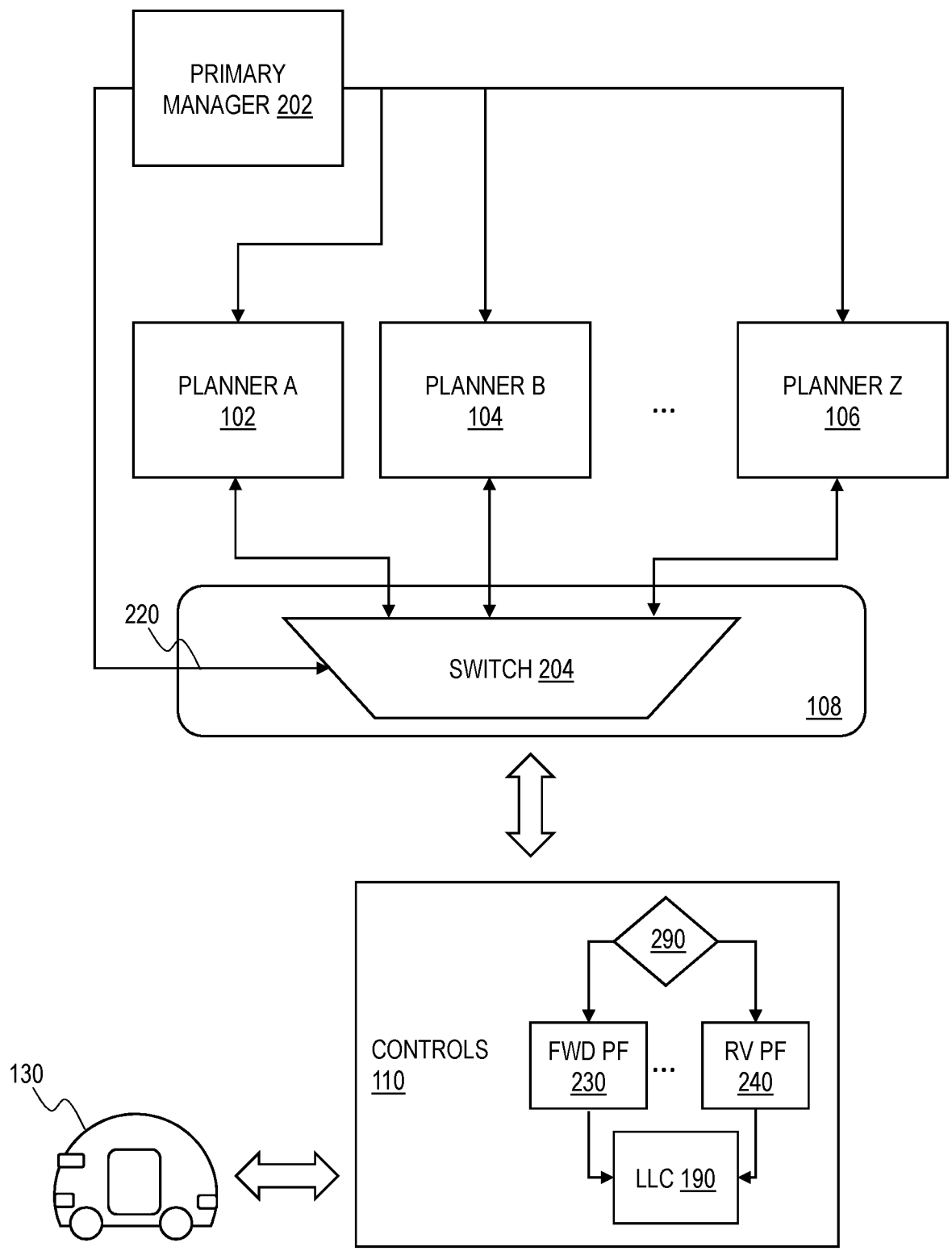
FIG. 2 illustrates a primary manager, (primary) planners, controls, and an exemplary unified interface between the planners and the controls that is controlled by the primary manager, according to some aspects of the disclosed technology.

FIG. 2 illustrates a primary manager, planners, controls, and an exemplary unified interface between the planners and the controls that is controlled by the manager, according to some aspects of the disclosed technology. With different planners designed to perform different tasks, operate under different scenarios, or achieve different goals, a primary manager 202 is provided to manage the planners, e.g., planner A 102, planner B 104, and planner Z 106. Depending on the task, scenario, or goal, primary manager 202 can activate one of the planners to produce plans. Primary manager 202 may have information on a given task to be performed by the vehicle, and instructs one of the planners to generate plans. All outputs of the planners may be coupled to the unified interface 108. Plans (or other information associated with plans) generated by the planners are thus provided to the unified interface 108. To output a plan from the planner that is active or in control, primary manager 202 may transmit a first selection signal 220 to a first switch 204 (or a first multiplexer) in unified interface 108. The first selection signal 220 corresponds to the planner that is active or in control of the vehicle, and allows the first switch 204 to select and output a plan generated by the planner that is active or in control of the vehicle. The first switch 204 may listen for the first selection signal 220 from the primary manager 202 to select an output (e.g., a plan) from the appropriate planner. Different planners may take different amounts of time to compute a plan, and the first switch 204 may check if the selected planner has produced a recent plan (or if the planner is ready to take control) before selecting the output from the planner. Primary manager 202 may determine which planner is the appropriate planner to produce plans for the vehicle, and generate the first selection signal 220 accordingly.

In some embodiments, only one of the planners is actively producing plans at a given point in time. Planners can be computationally resource intensive. Unless a given planner is needed, or is expected to be active or take control imminently, a given planner may be powered down or be inactivated. In some embodiments, more than one planner is actively producing plans at a given point in time. In some embodiments, two planners may not operate simultaneously during an operation of the vehicle.

In some cases, the planners may produce plans that involve the vehicle switching between different kinds of (nominal, normal driving) use cases, such as going forward and going in reverse. Controls 110 may be provided with different path followers designed, optimized, and tuned for different use cases. Depending on the use case, certain vehicle control commands or maneuvers can be performed for some use cases, but not for other use cases. The constraint(s) for finding an optimal local path may also differ depending on the use case. Providing different types of path followers in controls 110 may enable more complicated driving maneuvers to be performed in a specific output path, such as multi-point turns or parallel parking, which may switch between different use cases. In some cases, one path follower may be optimized for nominal driving, such as driving forward at speed, and another path follower may be optimized for driving in reverse. The path follower optimized for driving in reverse may be able to command the steering wheel to turn in-place, while the path follower optimized for driving forward at speed cannot.

In some embodiments ample, controls 110 may include a forward path follower 230 to generate a local forward path, and a reverse path follower 240 to generate a local reverse path. An arbiter 290 (e.g., a direction of motion arbiter) can be included in controls 110 to check the output path from unified interface 108 to determine (expected) direction of motion of the vehicle, e.g., determine if forward motion is involved or reverse motion is involved. The arbiter 290 selects or activates the appropriate path follower based on the direction of motion of the vehicle. If forward motion is involved, the arbiter 290 selects or activates the forward path follower 230. If reverse motion is involved, the arbiter 290 selects or activates the reverse path follower 240. Low-level controls 190 may be provided in controls 110 to generate (actuator) commands based on either the local forward path produced by forward path follower 230 or the local reverse path produced by reverse path follower 240.

Figure 3:
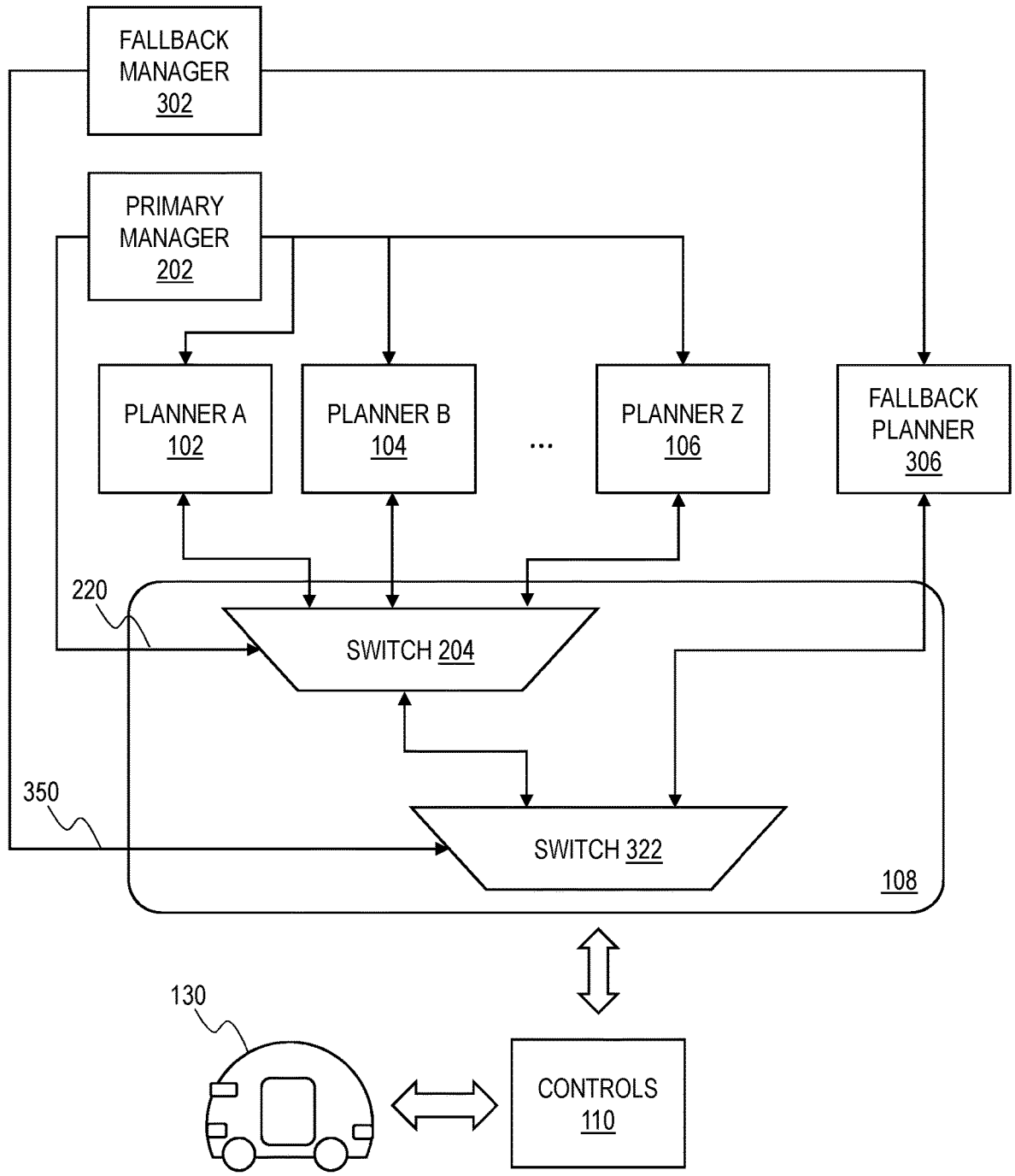
FIG. 3 illustrates a primary manager, (primary) planners, a fallback manager, a fallback planner, controls, and an exemplary unified interface between the planners and the controls that is controlled by the primary manager and the fallback manager, according to some aspects of the disclosed technology.

Exemplary Unified Interface Operating with a Primary Manager and a Fallback Manager FIG. 3 illustrates a primary manager, (primary) planners, a fallback manager, a fallback planner, controls, and an exemplary unified interface between the planners and the controls that is controlled by the manager and the fallback manager, according to some aspects of the disclosed technology. Some planners (e.g., planner A 102, planner B 104, and planner Z 106) described in relation to FIGS. 1 and 2 can be considered as primary planners, because they may be designed to operate when the vehicle is fully operational (e.g., performing normal or nominal driving tasks). In some cases, one or more fallback planners, such as fallback planner 306 may be provided and designed to take control of the vehicle when the vehicle is in a degraded state. Degraded state of the vehicle can occur in scenarios where the vehicle is no longer expected to be fully operational. Such scenarios can occur if there is a software and/or hardware failure of the vehicle.

Dependencies of fallback planner 306 may be orthogonal to dependencies of a primary planner (e.g., planner A 102, planner B 104, and planner Z 106), and would take over control of the AV if the AV is in a degraded state. To ensure that switching between a primary planner and a fallback planner 306 is done quickly, at least one of the primary planners and the fallback planner operate simultaneously during operation of the vehicle, where at least one of the primary planners and the fallback planner 306 are both producing plans at the same time. A fallback manager 302 may monitor for one or more degraded states.

In some embodiments, the fallback manager 302 may manage the fallback planner and output a second selection signal 350 to a second switch 322 (or a second multiplexer). An output of the first switch 204 and an output of fallback planner 306 are coupled to inputs of the second switch 322. The second selection signal 350 may cause the second switch 322 to select one of the inputs to be provided as output of the second switch 322. The inputs to the second switch 322 may include an output plan from the first switch 204 and a plan generated by the fallback planner 306. If the fallback manager 302 determines that the vehicle is not in a degraded state, the second selection signal 350 may cause the second switch 322 to output the output plan from the first switch 204. If the fallback manager 302 determines that the vehicle is in a degraded state, the second selection signal 350 may cause the second switch 322 to output the output plan from the fallback planner 306. Effectively, the second selection signal 350 from the fallback manager 302 may dictate whether the fallback planner 306 is to control the vehicle, such as AV 130. The fallback manager 302 may subscribe to one or more triggers that may indicate that the vehicle is in a degraded state. If one or more triggers is active, the fallback manager 302 may generate the second selection signal 350 accordingly.

Quickly and properly falling back (or failing safely) to a fallback planner 306 when a vehicle enters a degraded state of operation can be critical to proper performance and operation of the vehicle, such as AV 130. Therefore, two separately controlled switches, i.e., the first switch 204, and the second switch 322 are preferably implemented. The first switch 204 can be designed and dedicated to switching/transitioning between primary planners, and the second switch 322 can be designed and dedicated to switching/transitioning between a primary planner and a fallback planner. Implementing the second switch 322 dedicated to handling switching/transitioning between the primary planner and the fallback planner may offer benefits for functional safety (FuSa). Implementing two separate and independent switches (e.g., first switch 204 and second switch 322) allows for the switches to be implemented to meet different requirements. For example, the second switch 322 may be implemented with higher integrity than the first switch 204 to not suffer from the same or similar failure modes as the first switch. The second switch 322 may be implemented to meet certain timing constraints unique to the second switch 322 when switching/transitioning from the primary planner and the fallback planner.

In some embodiments, there may be multiple fallback planners for different corresponding degraded states, e.g., each implemented to take over control of the AV when the AV is in a corresponding degraded state. The second switch 322 may receive paths from additional fallback planners and can select one of the output from the first switch 204 and one of the outputs of the fallback planners to be used, based on a second selection signal 350 from the fallback manager 302.

Controls 110 may receive an output plan from the second switch 322, and generate and output commands to the vehicle hardware controls of AV 130 to carry out the received output plan.

Exemplary Unified Interface Having a Plan Checker

Figure 4:
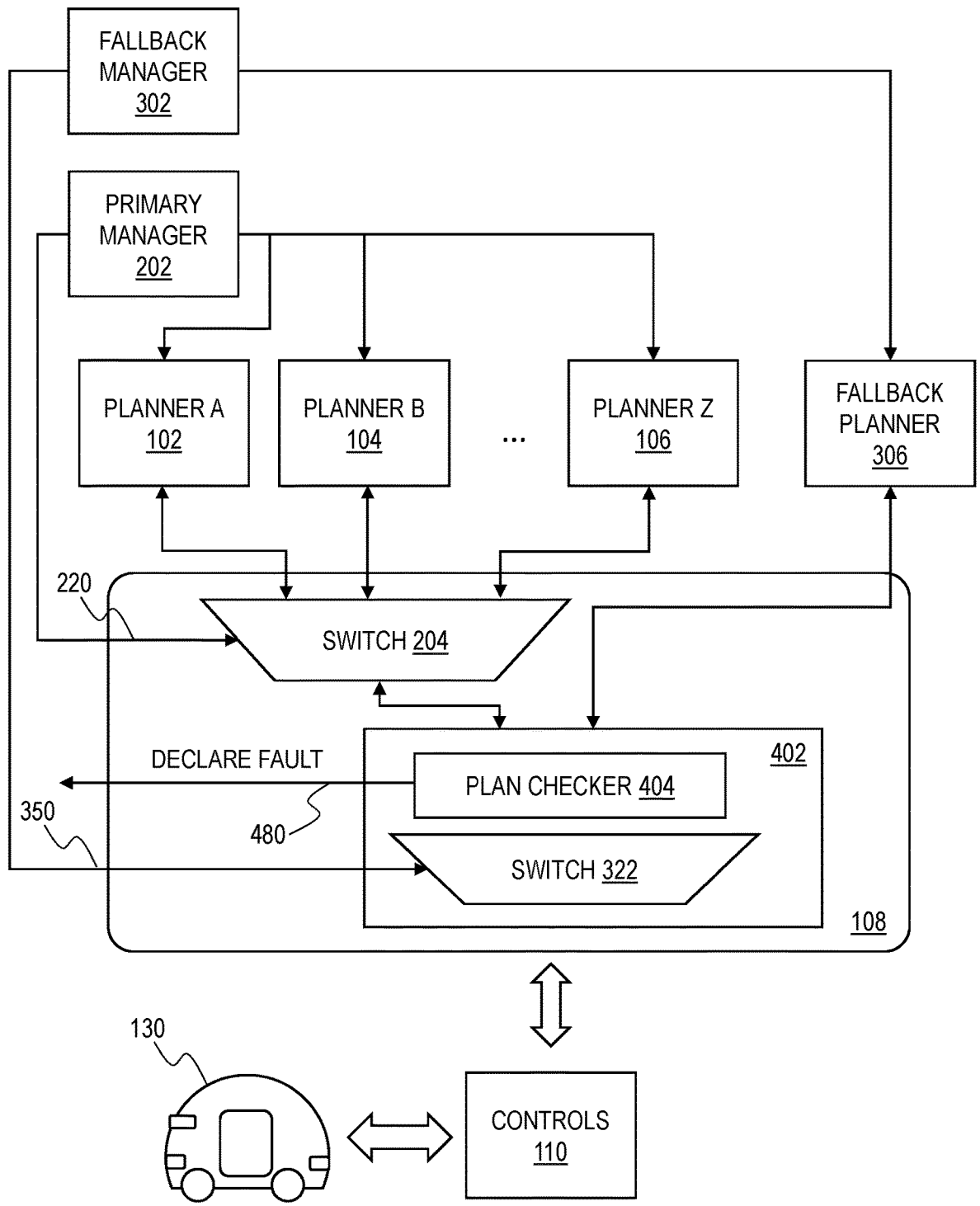
FIG. 4 illustrates an exemplary unified interface that includes a plan checker, according to some aspects of the disclosed technology.

FIG. 4 illustrates an exemplary unified interface that includes a plan checker, according to some aspects of the disclosed technology. Being placed between upstream planners and downstream controls, the unified interface 108 may be implemented with a plan checker 404 to ensure that the plans to be sent to controls 110 are feasible and consistent. An interface 402, having plan checker 404 and the second switch 322, may be provided in unified interface 108 that interfaces and receives with an output plan from the first switch 204 and a plan generated by the fallback planner 306. For instance, plan checker 404 may receive an output plan from the first switch 204 and a plan generated by the fallback planner 306. Plan checker 404 may have a set of rules that can be validated against or applied to the output plan from the first switch 204 and the plan generated by the fallback planner 306. Rules may include implicit contracts relating to planning and control of the vehicle, such as AV 130. Plan checker 404 may declare a fault 480 if a rule in the rules is violated, or if inconsistencies/discrepancies in planning and control of the vehicle are detected. The fault being declared may indicate that the planning stack is not operating normally, which could in turn cause the vehicle such as AV 130 to enter a degraded state of operation.

In some embodiments, plan checker 404 may determine if the vehicle can properly failover from executing a plan generated by one of the primary planners to a plan generated by the fallback planner 306. In some embodiments, plan checker 404 may enforce rules having certain requirements relating to feasibility. For instance, certain gear changes may not be feasible. In some embodiments, plan checker 404 may enforce rules having certain requirements ensuring self-consistency. For instance, feedback information and current plan may be verified to ensure that the state of the vehicle (e.g., speed, direction, pose, etc.) is consistent with the current plan, or that the current plan passes a sanity check. In some embodiments, plan checker 404 may enforce rules having certain requirements ensuring consistency over time, or consistency across planners. For instance, a certain sequence of commands (e.g., changing in direction of motion) may not be feasible.

Plan checker 404 enforcing such rules may alleviate the need to provide arbiter(s) (such as a gear arbiter) to double check vehicle control commands being sent to vehicle hardware controls AV 130. Such arbiters in the control layer may not be ideal since these arbiters may have no contextual information about the path to be executed.

Exemplary Feedback Information Provided by Unified Interface to Planner(s)

While planners can operate in an open-loop fashion, and produce seeded paths that can be executed by the control layer, planners can operate better in a closed-loop fashion where feedback information from the control layer can be provided back to the planners (e.g., one of the primary planners or the fallback planner) so that paths can be updated accordingly. Planners can update the seed, or starting point, of a path based on the feedback information.

Feedback information may be related to plans and/or controls being executed. Feedback information may be related to state information of the AV if state information is available. Feedback information may be related to estimates of the state information of the AV (e.g., pose estimation), if state information is not available. Feedback information may be particularly useful to the planner that is active or in control of the vehicle, so that the planner can update/refresh the output path accordingly.

Unified interface 108 as seen in the Figures can provide feedback information to planners that are upstream of the unified interface 108 (e.g., planner A 102, planner B 104, planner Z 106, and fallback planner 306, etc.). Feedback information may be generated by unified interface 108. Feedback information may be generated by components downstream of the unified interface 108 (e.g., controls 110, vehicle hardware controls of vehicle, sensors of vehicle, etc.), and the unified interface 108 may be responsible for passing the feedback information to a planner that is active or in control, or a planner that is expecting the feedback information.

In some embodiments, unified interface 108 may transmit feedback information involving a timestamp associated with or corresponding to the output plan generated by the planner that is in control. In some embodiments, unified interface 108 can transmit an indication to the planner that is in control of the vehicle that the planner is in control of the vehicle.

Examples of feedback information may include:
position control error (how far off is the actual/estimated position of the vehicle to a local path produced by a path follower or how far off is the actual/estimated position of the vehicle an expected position of the vehicle executing a set of commands),
a current gear of the vehicle,
a target gear of the vehicle (e.g., next gear of the vehicle),
gear shifting readiness of the vehicle (which can change depending on whether the vehicle is on an incline or sloped road),
estimate of gear shifting duration of the vehicle (which can change depending on whether the vehicle is on an incline or sloped road),
current state information corresponding to a vehicle blinker light of the vehicle (e.g., on, flashing, off, not operational, etc.),
target state information corresponding to a vehicle blinker light of the vehicle (e.g., flashing, off, etc.),
current state information corresponding to a vehicle hazard light of the vehicle (e.g., on, flashing, off, not operational, etc.), and
target state information corresponding to a vehicle hazard light of the vehicle (e.g., flashing, off, etc.).

Exemplary Methods Implemented by the Unified Interface

Figure 5:
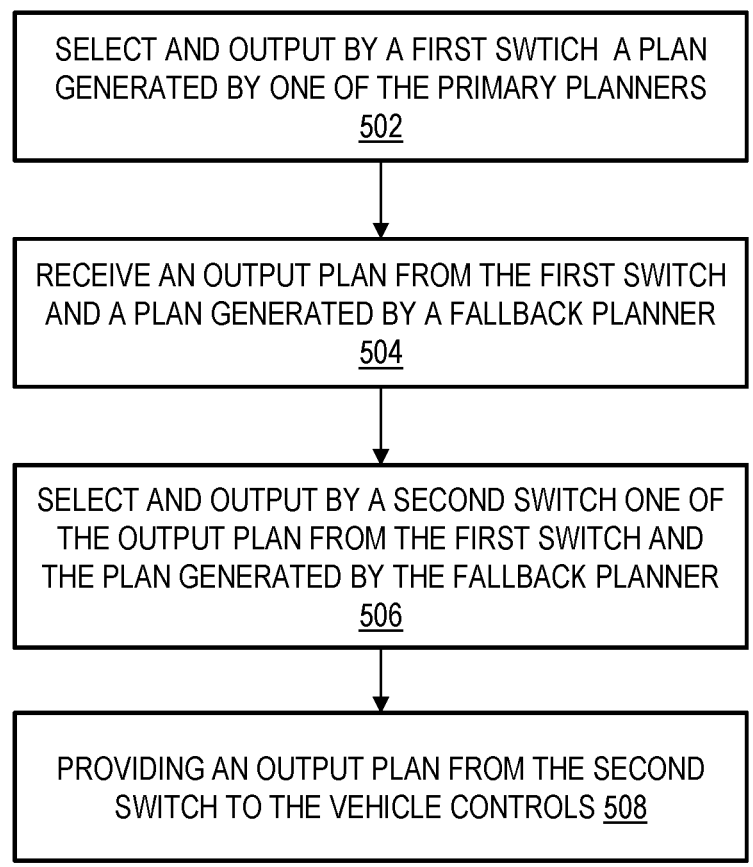
FIG. 5 is a flow diagram illustrating a computer-implemented method that can be performed by the unified interface between the planners and the controls, according to some aspects of the disclosed technology.

FIG. 5 is a flow diagram illustrating a computer-implemented method that can be performed by the unified interface between the planners and the controls, according to some aspects of the disclosed technology. In 502, a first switch (e.g., a first switch 204 of the Figures) can select and output a plan generated by one of a plurality of primary planners (e.g., planner A 102, planner B 104, and planner Z 106). In 504, an output plan from the first switch and a plan generated by a fallback planner (e.g., fallback planner 306 of the Figures) may be received (e.g., by interface 402 or a second switch 322 of FIG. 4). In 506, a second switch (e.g., a second switch 322 of the Figures) may select and output one of: the output plan from the first switch and the plan generated by the fallback planner. In 508, an output plan may be provided from the second switch to vehicle controls (e.g., controls 110 of the Figures).

Exemplary AV Management System

Figure 6:
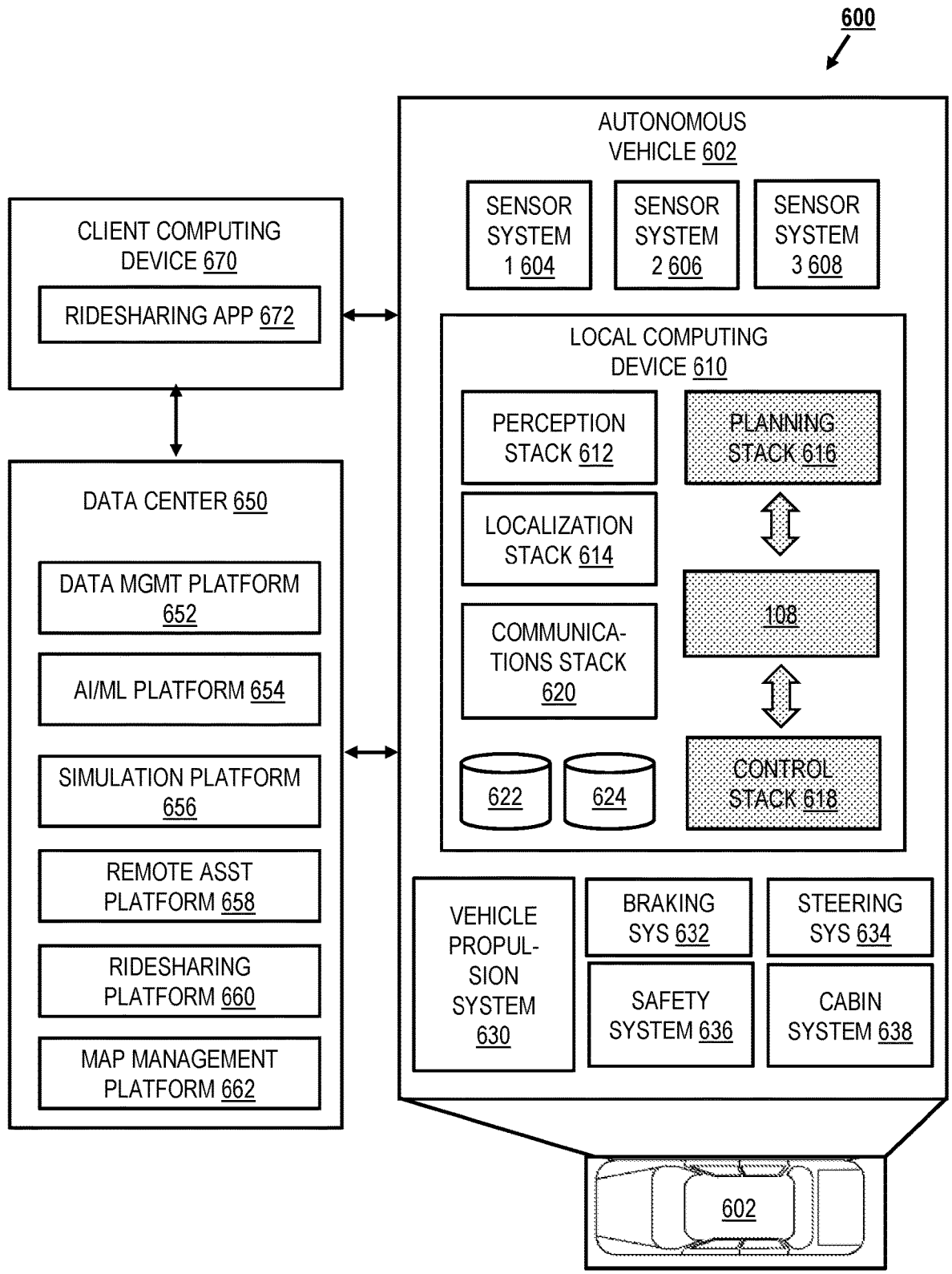
FIG. 6 illustrates an example system environment that may be used to facilitate AV operations, according to some aspects of the disclosed technology.

Turning now to FIG. 6, this figure illustrates an example of an AV management system 600, in which some of the aspects of the present disclosure can be implemented. One of ordinary skill in the art will understand that, for the AV management system 600 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. AV 602 may be an example of AV 130 in the Figures. The AV 602, the data center 650, and the client computing device 670 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 may navigate about roadways without a human driver based on sensor signals generated by multiple sensor systems 604, 606, and 608. The sensor systems 604-608 may include different types of sensors and may be arranged about the AV 602. For instance, the sensor systems 604-608 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 may be a camera system, the sensor system 606 may be a LIDAR system, and the sensor system 608 may be a RADAR system. Other embodiments may include any other number and type of sensors.

AV 602 may also include several mechanical systems that may be used to maneuver or operate AV 602. For instance, the mechanical systems may include vehicle propulsion system 630, braking system 632, steering system 634, safety system 636, and cabin system 638, among other systems. Vehicle propulsion system 630 may include an electric motor, an internal combustion engine, or both. The braking system 632 may include an engine brake, a wheel braking system (e.g., a disc braking system that utilizes brake pads), hydraulics, actuators, and/or any other suitable componentry configured to assist in decelerating AV 602. The steering system 634 may include suitable componentry configured to control the direction of movement of the AV 602 during navigation. Safety system 636 may include lights and signal indicators, a parking brake, airbags, and so forth. The cabin system 638 may include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 may include one or more client interfaces (e.g., GUIs, Voice User Interfaces (VUIs), etc.) for controlling certain aspects of the mechanical systems 630-638.

AV 602 may additionally include a local computing device 610 that is in communication with the sensor systems 604-608, the mechanical systems 630-638, the data center 650, and the client computing device 670, among other systems. The local computing device 610 may include one or more processors and memory, including instructions that may be executed by the one or more processors. The instructions may make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, an HD geospatial database 622, and an AV operational database 624, among other stacks and systems.

Perception stack 612 may enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 may detect and classify objects and determine their current and predicted locations, speeds, directions, and the like. In addition, the perception stack 612 may determine the free space around the AV 602 (e.g., to maintain a safe distance from other objects, change lanes, park the AV, etc.). The perception stack 612 may also identify environmental uncertainties, such as where to look for moving objects, flag areas that may be obscured or blocked from view, and so forth.

Mapping and localization stack 614 may determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 may compare sensor data captured in real-time by the sensor systems 604-608 to data in the HD geospatial database 622 to determine its precise (e.g., accurate to the order of a few centimeters or less) position and orientation. The AV 602 may focus its search based on sensor data from one or more first sensor systems (e.g., GPS) by matching sensor data from one or more second sensor systems (e.g., LIDAR). If the mapping and localization information from one system is unavailable, the AV 602 may use mapping and localization information from a redundant system and/or from remote data sources.

The planning stack 616 may determine how to maneuver or operate the AV 602 safely and efficiently in its environment. For instance, the planning stack 616 may produce a plan for the AV 602, which can include a (reference) trajectory. The planning stack 616 may include a plurality of planners, including two or more of the following: planner A 102, planner B 104, . . . planner Z 106, and fallback planner 306 in the Figures. Depending on the implementation, planning stack 616 may include primary manager 202 and/or fallback manager 302 in the Figures. For example, the planning stack 616 may receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 602 from one point to another. The planning stack 616 may determine multiple sets of one or more mechanical operations that the AV 602 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 may select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 may manage the operation of the vehicle propulsion system 630, the braking system 632, the steering system 634, the safety system 636, and the cabin system 638. Control stack 618 may receive a plan from the planning stack 616. Control stack 618 may include controls 110 in the Figures. The control stack 618 may receive sensor signals from the sensor systems 604-608 as well as communicate with other stacks or components of the local computing device 610 or a remote system (e.g., the data center 650) to effectuate the operation of the AV 602. For example, the control stack 618 may implement the final path or actions from the multiple paths or actions provided by the planning stack 616. The implementation may involve turning the plan from the planning stack 616 into commands for vehicle hardware controls such as the actuators that control the AV's steering, throttle, brake, and drive unit.

A unified interface 108 of the Figures can be provided between the planning stack 616 (e.g., planning stack 150 of FIG. 1) and the control stack 618 (e.g., control stack 160 of FIG. 1).

The communication stack 620 may transmit and receive signals between the various stacks and other components of the AV 602 and between the AV 602, the data center 650, the client computing device 670, and other remote systems. The communication stack 620 may enable the local computing device 610 to exchange information remotely over a network. The communication stack 620 may also facilitate local exchange of information, such as through a wired connection or a local wireless connection.

The HD geospatial database 622 may store HD maps and related data of the streets upon which the AV 602 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 624 may store raw AV data generated by the sensor systems 604-608 and other components of the AV 602 and/or data received by the AV 602 from remote systems (e.g., the data center 650, the client computing device 670, etc.). In some embodiments, the raw AV data may include HD LIDAR point cloud data, image or video data, RADAR data, GPS data, and other sensor data that the data center 650 may use for creating or updating AV geospatial data as discussed further below with respect to FIG. 5 and elsewhere in the present disclosure.

The data center 650 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 650 may include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 may send and receive various signals to and from the AV 602 and the client computing device 670. These signals may include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 may access data stored by the data management platform 652 to provide their respective services.

The AI/ML platform 654 may provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists may prepare data sets from the data management platform 652; select, design, and train machine learning models; evaluate, refine, and deploy the models; maintain, monitor, and retrain the models; and so on.

The remote assistance platform 658 may generate and transmit instructions regarding the operation of the AV 602. For example, in response to an output of the AI/ML platform 654 or other system of the data center 650, the remote assistance platform 658 may prepare instructions for one or more stacks or other components of the AV 602.

The ridesharing platform 660 may interact with a customer of a ridesharing service via a ridesharing application 672 executing on the client computing device 670. The client computing device 670 may be any type of computing system, including a server, desktop computer, laptop, tablet, smartphone, smart wearable device (e.g., smart watch; smart eyeglasses or other Head-Mounted Display (HMD); smart ear pods or other smart in-car, on-car, or over-ear device; etc.), gaming system, or other general-purpose computing device for accessing the ridesharing application 672. The client computing device 670 may be a customer's mobile computing device or a computing device integrated with the AV 602 (e.g., the local computing device 610). The ridesharing platform 660 may receive requests to be picked up or dropped off from the ridesharing application 672 and dispatch the AV 602 for the trip.

Map management platform 662 may provide a set of tools for the manipulation and management of geographic and spatial (geospatial) and related attribute data. The data management platform 652 may receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data may be processed, and map management platform 662 may render base representations (e.g., tiles (2D), bounding volumes (3D), etc.) of the AV geospatial data to enable users to view, query, label, edit, and otherwise interact with the data. Map management platform 662 may manage workflows and tasks for operating on the AV geospatial data. Map management platform 662 may control access to the AV geospatial data, including granting or limiting access to the AV geospatial data based on user-based, role-based, group-based, task-based, and other attribute-based access control mechanisms. Map management platform 662 may provide version control for the AV geospatial data, such as to track specific changes that (human or machine) map editors have made to the data and to revert changes when necessary. Map management platform 662 may administer release management of the AV geospatial data, including distributing suitable iterations of the data to different users, computing devices, AVs, and other consumers of HD maps. Map management platform 662 may provide analytics regarding the AV geospatial data and related data, such as to generate insights relating to the throughput and quality of mapping tasks.

In some embodiments, the map viewing services of map management platform 662 may be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit enroute to a pick-up or drop-off location, and so on.

Exemplary Processor-Based System

Figure 7:
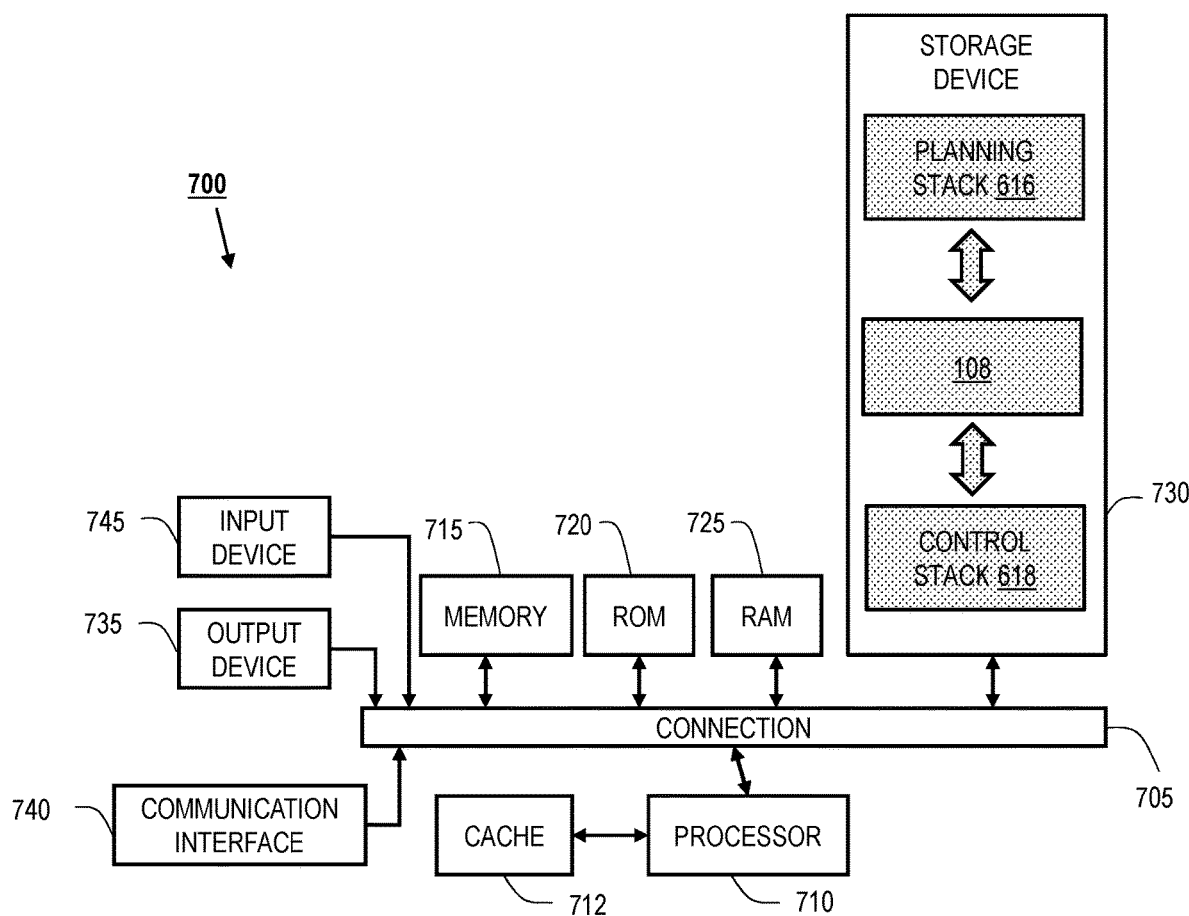
FIG. 7 illustrates an example processor-based system with which some aspects of the subject technology may be implemented.

FIG. 7 illustrates an example processor-based system with which some aspects of the subject technology may be implemented. For example, processor-based system 700 may be any computing device making up, or any component thereof in which the components of the system are in communication with each other using connection 705. Connection 705 may be a physical connection via a bus, or a direct connection into processor 710, such as in a chipset architecture. Connection 705 may also be a virtual connection, networked connection, or logical connection.

In some embodiments, computing system 700 represents the local computing device 610 of FIG. 6. In some embodiments, one or more of the described system components represents many such components each performing some or all of the function for which the component is described. In some embodiments, the components may be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 may include a cache of high-speed memory 712 connected directly with, in close proximity to, or integrated as part of processor 710.

Processor 710 may include any general-purpose processor and a hardware service or software service, such as executable instructions that implement functionalities carried out by planning stack 616, unified interface 108, and control stack 618 as illustrated in the Figures. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which may represent any number of input mechanisms, such as a microphone for speech, a touch-sensitive screen for gesture or graphical input, keyboard, mouse, motion input, speech, etc. Computing system 700 may also include output device 735, which may be one or more of a number of output mechanisms known to those of skill in the art. In some instances, multimodal systems may enable a user to provide multiple types of input/output to communicate with computing system 700. Computing system 700 may include communications interface 740, which may generally govern and manage the user input and system output. The communication interface may perform or facilitate receipt and/or transmission of wired or wireless communications via wired and/or wireless transceivers.

Storage device 730 may be a non-volatile and/or non-transitory and/or computer-readable memory device and may be a hard disk or other types of computer-readable media which may store data that are accessible by a computer.

Storage device 730 may include software services, servers, services, etc., that when the code that defines such software is executed by the processor 710, it causes the system 700 to perform a function. In some embodiments, a hardware service that performs a particular function may include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

SELECT EXAMPLES

Example 1 is a vehicle comprising: vehicle hardware controls; one or more processors; and one or more storage encoding instructions executable by the one or more processors to implement a software stack, wherein the software stack includes: a plurality of primary planners (e.g., planner A 102, planner B 104, . . . and planner Z 106 as illustrated in the Figures); a first multiplexer to select and output a plan generated by one of the primary planners (inputs to the first multiplexer may include outputs of the primary planners, and the first multiplexer may receive a selection signal 220 from the primary manager 202); a fallback planner (e.g., fallback planner 306 as illustrated in the Figures); a second multiplexer to select one of: an output plan from the first multiplexer and a plan generated by the fallback planner (inputs to the second multiplexer may include output of the first multiplexer and output of the fallback planner 306, and the second multiplexer may receive a selection signal 350 from the fallback manager 302); and (software) vehicle controls to receive an output plan from the second multiplexer and output commands to the vehicle hardware controls to carry out the received output plan. The primary planners may generate plans for the vehicle when the vehicle is in a first state (e.g., a normal driving state where the vehicle is performing nominal driving tasks). The fallback planner may generate plans for the vehicle when the vehicle is in a second state (e.g., a degraded state).

In Example 2, the vehicle of Example 1 can optionally include the vehicle being an autonomous vehicle.

In Example 3, the vehicle of Example 1 or 2 can optionally include the vehicle hardware controls comprising vehicle gear control, vehicle blinker light control, vehicle hazard light control, vehicle steering control, vehicle brake control, and vehicle motor controls.

In Example 4, the vehicle of any one of Examples 1-3 can optionally include the vehicle hardware controls comprising vehicle horn control.

In Example 5, the vehicle of any one of Examples 1-4 can optionally include the plurality of primary planners comprising two or more planners with different driving goals.

In Example 6, the vehicle of any one of Examples 1-5 can optionally include at least one of the primary planners and the fallback planner operating simultaneously during operation of the vehicle.

In Example 7, the vehicle of any one of Examples 1-6 can optionally include the software stack further including a primary manager that manages the primary planners and outputs a first selection signal to the first multiplexer.

In Example 8, the vehicle of any one of Examples 1-7 can optionally include the software stack further including a fallback manager that manages the fallback planner and outputs a second selection signal to the second multiplexer.

In Example 9, the vehicle of any one of Examples 1-8 can optionally include the software stack further including a plan checker to enforce rules on: the output plan from the first multiplexer and a plan generated by the fallback planner.

In Example 10, the vehicle of any one of Examples 1-9 can optionally include the vehicle controls comprising: a path follower to generate a local path for the vehicle to take, wherein the local path is optimized based on tracking error of the local path relative to a trajectory in the received output plan, and low-level controls to generate actuator commands based on the local path.

In Example 11, the vehicle of any one of Examples 1-9 can optionally include the vehicle controls comprising: an arbiter to determine direction of motion of the vehicle; a forward path follower to generate a local forward path; a reverse path follower to generate a local reverse path; wherein the arbiter is to select a forward path follower or a reverse path follower based on the direction of motion of the vehicle, and low-level controls to generate actuator commands based on the local forward path or the local reverse path.

Example 12 is a computer-implemented method for controlling a vehicle, the computer-implemented method comprising: selecting and outputting, by a first switch, a plan generated by one of a plurality of primary planners; receiving an output plan from the first switch and a plan generated by a fallback planner; selecting and outputting, by a second switch, one of: the output plan from the first switch and the plan generated by the fallback planner; and providing an output plan from the second switch to vehicle controls.

In Example 13, the computer-implemented method of Example 12 can optionally include generating a local path for the vehicle to take based on a trajectory of the output plan received by the vehicle controls; and generating commands to vehicle hardware controls based on the local path.

In Example 14, the computer-implemented method of Example 12 or 13 can optionally include enforcing rules on the output plan from the first switch and a plan generated by the fallback planner.

In Example 15, the computer-implemented method of Example 14 can optionally include declaring a fault if a rule in the rules is violated.

In Example 16, the computer-implemented method of any one of Example 12-15 can optionally include the output plan from the second switch being generated by a planner that is in control of the vehicle, wherein the planner that is in control of the vehicle is one of: the primary planners and the fallback planner.

In Example 17, the computer-implemented method of Example 16 can optionally include transmitting a timestamp associated with the output plan generated by the planner that is in control.

In Example 18, the computer-implemented method of Example 16 or 17 can optionally include transmitting an indication to the planner that is in control of the vehicle that the planner is in control of the vehicle.

In Example 19, the computer-implemented method of any one of Examples 12-18 can optionally include providing feedback information of the vehicle controls to one of: the primary planners and the fallback planner.

In Example 20, the computer-implemented method of Example 19 can optionally include the feedback information comprising a current gear of the vehicle.

In Example 21, the computer-implemented method of Example 19 or 20 can optionally include the feedback information comprising a target gear of the vehicle.

In Example 22, the computer-implemented method of any one of Examples 19-21 can optionally include the feedback information comprising gear shifting readiness of the vehicle.

In Example 23, the computer-implemented method of any one of Examples 19-22 can optionally include the feedback information comprising estimate of gear shifting duration of the vehicle.

In Example 24, the computer-implemented method of any one of Examples 19-23 can optionally include the feedback information comprising current state information corresponding to a vehicle blinker light of the vehicle.

In Example 25, the computer-implemented method of any one of Examples 19-24 can optionally include the feedback information comprising target state information corresponding to a vehicle blinker light of the vehicle.

In Example 26, the computer-implemented method of any one of Examples 19-25 can optionally include the feedback information comprising current state information corresponding to a vehicle hazard light of the vehicle.

In Example 27, the computer-implemented method of any one of Examples 19-26 can optionally include the feedback information comprising target state information corresponding to a vehicle hazard light of the vehicle.

In Example 28, the computer-implemented method of any one of Examples 19-27 can optionally include the feedback information comprising position control error of the vehicle.

In Example 29, the computer-implemented method of any one of Examples 12-28 can optionally include receiving, by the first switch, a first selection signal from a primary manager that selects one of the planners to output a plan for the vehicle.

In Example 30, the computer-implemented method of any one of Examples 12-29 can optionally include receiving, by the second switch, a second selection signal from a fallback manager that dictates whether the fallback planner is to control the vehicle.

Example 31 is a computer-implemented system, comprising: one or more processing units; and one or more non-transitory computer-readable media storing instructions, when executed by the one or more processing units, cause the one or more processing units to perform the computer-implemented methods of any one of Examples 1-30.

Example 32 has one or more non-transitory computer-readable media storing instructions, when executed by the one or more processing units, cause the one or more processing units to perform the computer-implemented methods of any one of Examples 1-30.

Example 33 is an apparatus comprising means to perform the computer-implemented methods of any one of Examples 1-30.

What is claimed is:

1. A vehicle, comprising:
   vehicle hardware controls;
   one or more processors; and
   one or more storage encoding instructions executable by the one or more processors to implement a software stack, wherein the software stack includes:
   a plurality of primary planners;
   a first multiplexer to select and output a plan generated by one of the primary planners;
   a fallback planner;
   a fallback manager that determines whether the vehicle is in a degraded state:
   a second multiplexer to select one of an output plan from the first multiplexer when the vehicle is not in the degraded state and a plan generated by the fallback planner when the vehicle is in the degraded state; and
   vehicle controls to receive an output plan from the second multiplexer and output commands to the vehicle hardware controls to carry out the received output plan.

2. The vehicle of claim 1, wherein the vehicle hardware controls comprise one or more of: vehicle gear control, vehicle blinker light control, vehicle hazard light control, vehicle steering control, vehicle brake control, vehicle motor controls, and vehicle horn control.

3. The vehicle of claim 1, wherein the plurality of primary planners comprise two or more planners with different driving goals.

4. The vehicle of claim 1, wherein at least one of the primary planners and the fallback planner operate simultaneously during operation of the vehicle.

5. The vehicle of claim 1, wherein the software stack further includes a plan checker to determining when the vehicle can failover from executing the plan generated by one of the primary planners to the plan generated by the fallback planner.

6. The vehicle of claim 1, wherein the vehicle controls comprises:
   a path follower to generate a local path for the vehicle to take, wherein the local path is optimized based on tracking error of the local path relative to a trajectory in the received output plan, and
   low-level controls to generate actuator commands based on the local path.

7. The vehicle of claim 1, wherein the vehicle controls comprises:
   an arbiter to determine direction of motion of the vehicle;
   a forward path follower to generate a local forward path;
   a reverse path follower to generate a local reverse path;
   wherein the arbiter is to select the forward path follower or the reverse path follower based on the direction of motion of the vehicle; and
   low-level controls to generate actuator commands based on the local forward path or the local reverse path.

8. A computer-implemented method for controlling a vehicle, the method comprising:
   selecting and outputting, by a first switch, a plan generated by one of a plurality of primary planners;

receiving, at a second switch, an output plan from the first switch and a plan generated by a fallback planner;

determining whether the vehicle is in a degraded state at a fallback manager;

selecting and outputting, by the second switch, one of the output plan from the first switch when the vehicle is not in the degraded state and the plan generated by the fallback planner when the vehicle is in the degraded state;

providing an output plan from the second switch to vehicle controls; and operating vehicle controls to carry out the output plan received from the second switch.

9. The computer-implemented method of claim 8, further comprising:

generating a local path for the vehicle to take based on a trajectory of the output plan received by the vehicle controls; and generating commands to vehicle hardware controls based on the local path.

10. The computer-implemented method of claim 8, further comprising:

enforcing rules on the output plan from the first switch and a plan generated by the fallback planner; and declaring a fault if a rule in the rules is violated.

11. The computer-implemented method of claim 8, further comprising:

providing feedback information of the vehicle controls to one of: the primary planners and the fallback planner.

12. The computer-implemented method of claim 11, wherein the feedback information comprises one or more of:

a current gear of the vehicle;

a target gear of the vehicle;

gear shifting readiness of the vehicle;

estimate of gear shifting duration of the vehicle;

current state information corresponding to a vehicle blinker light of the vehicle;

target state information corresponding to a vehicle blinker light of the vehicle;

current state information corresponding to a vehicle hazard light of the vehicle; and target state information corresponding to a vehicle hazard light of the vehicle.

13. The computer-implemented method of claim 11, wherein the feedback information comprises position control error of the vehicle.

14. A computer-implemented system, comprising:

one or more processing units;

one or more non-transitory computer-readable media storing instructions, when executed by the one or more processing units, cause the one or more processing units to perform operations comprising:

selecting and outputting, by a first switch, a plan generated by one of a plurality of primary planners;

receiving, at a second switch, an output plan from the first switch and a plan generated by a fallback planner;

determining whether the vehicle is in a degraded state at a fallback manager;

selecting and outputting, by the second switch, one of the output plan from the first switch when the vehicle is not in the degraded state and the plan generated by the fallback planner when the vehicle is in the degraded state;

providing an output plan from the second switch to vehicle controls; and operating the vehicle controls to carry out the output plan received from the second switch.

* * * * *